Feb. 17, 1942.  N. M. COUTY  2,273,393
HEAT SHIELDED FLEXIBLE HOSE
Filed July 18, 1940
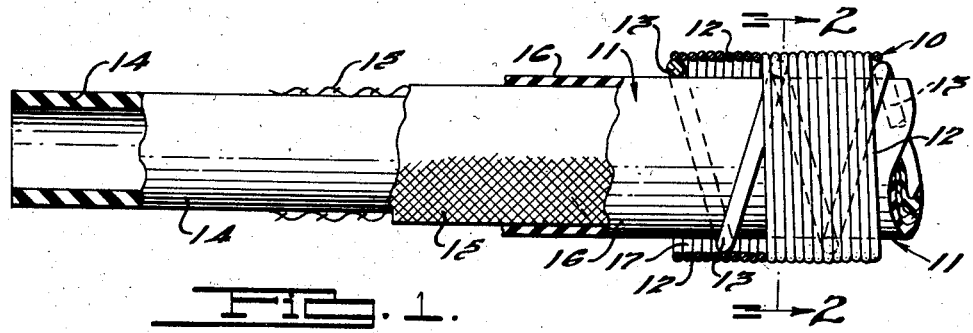
FIG. 1.
FIG. 2.
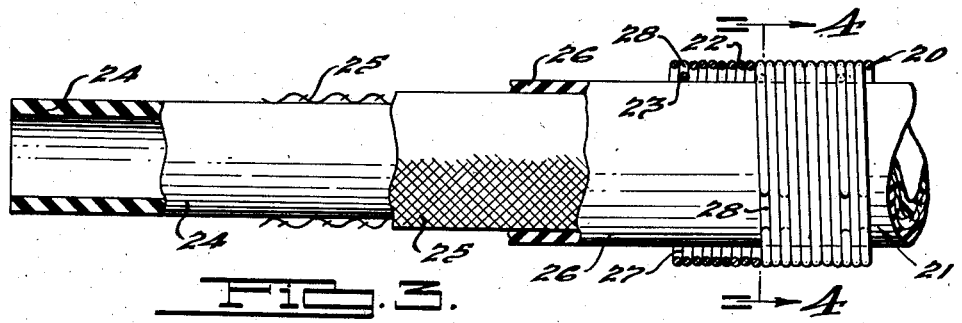
FIG. 3.
FIG. 4.
INVENTOR
Norman M. Couty.
BY
ATTORNEY Patented Feb. 17, 1942

2,273,393

UNITED STATES PATENT OFFICE 2,273,393

HEAT SHIELDED FLEXIBLE HOSE

Norman M. Couty, Detroit, Mich., assignor to The Flex-O-Tube Company, a corporation of Delaware Application July 18, 1940, Serial No. 346,074

1 Claim. (Cl. 138—60)

This invention relates to flexible hose and in particular to flexible hose adapted for use in the presence of heat at such high temperatures as would have a deleterious effect on the rubber, synthetic rubber compound, fabric or the like of which the hose is manufactured.

When flexible hose is used for gasoline lines, oil lines and water lines connecting the various units of the fuel, lubricating and cooling systems of automotive, aircraft and marine power plants and in other instances where extremely high temperatures are common adjacent flexible hose lines, it has been found that the continuous subjecting of flexible hose constructed of rubber, synthetic rubber compound, fabric and the like to temperatures above 150 degrees Fahrenheit causes the said hose to char, gradually dry out or disintegrate in some form or another. Often, power plants of automobiles, aircraft, motor boats, farm lighting plants and the like become overheated during certain periods of their operation because of improper ignition, lack of lubrication, failure of the cooling system thereof, and for many other reasons whereupon the temperatures contemplated by engineers when employing flexible hose constructed of rubber, synthetic rubber compound, fabric and the like for making the necessary connections between the fuel, oil, water and air systems of such power plants are greatly exceeded.

With the foregoing in view, it is the primary object of this invention to provide flexible hose for continuous use in the presence of radiant heat of from 150 to 400 or more degrees Fahrenheit which will not deteriorate by charring or otherwise disintegrating during such use.

Another object of the invention is to provide a flexible hose having its flexible tubular core metal sheathed to increase resistance to deterioration by radiant heat, the said metal sheathing being accomplished without material reduction in the flexibility of the hose.

Another object of the invention is to provide a flexible hose constructed of a flexible tubular core of rubber, synthetic rubber compound, fabric and the like and a spirally wound reflective wire sheath and means for holding the said spirally wound reflective sheath in spaced relationship with respect to the said flexible tubular core.

Another object of the invention is to provide a flexible hose constructed of a flexible tubular core of rubber, synthetic rubber compound, fabric and the like and a relatively flat pitch spirally wound reflective wire sheath held in spaced relationship with respect to the flexible tubular core by a relatively long pitch spiral spacer.

Another object of the invention is to provide a flexible hose constructed of a flexible tubular core of rubber, synthetic rubber compound, fabric and the like and a relatively flat pitch spirally wound reflective wire sheath deformed at intervals therearound and therealong for maintaining said sheath in spaced relationship to the said flexible tubular core.

Other objects of the invention will become apparent by reference to the following detailed description taken in connection with the accompanying drawing, in which:

Fig. 1 is a view part in section and part in elevation of a flexible hose embodying the invention wherein portions thereof are successively broken away to illustrate the construction.

Fig. 2 is a cross sectional view taken on the line 2—2 of Fig. 1.

Fig. 3 is a view part in section and part in elevation of a flexible hose disclosing another embodiment of the invention wherein portions thereof are successively broken away to illustrate the construction.

Fig. 4 is a cross sectional view taken on the line 4—4 of Fig. 3.

Although the invention has been disclosed herein in conjunction with a particular type of tubular flexible core, it is to be understood that other types of flexible cores constructed of other materials than the type herein disclosed may be used with like and similar spirally wound reflective sheaths held in spaced relationship thereto for the purpose of preventing the absorption of radiant heat by the material from which the said flexible cores are constructed.

Referring now to the drawing wherein like numerals refer to like and corresponding parts throughout the several views and in particular to the embodiment of the invention disclosed in Figs. 1 and 2, the flexible hose generally designated by the numeral 10 comprises a tubular flexible core 11 covered by a relatively flat pitch spirally wound reflective sheath 12 held in spaced relationship to the said core 11 by a relatively long pitch spiral spacer 13. The said core 11 may be of any flexible tubing and is shown in the drawing as composed of an inner tube 14 of rubber or synthetic rubber compound, a fabric reinforcement 15 woven or braided over the said inner tube 14, and an outer cover of rubber or synthetic rubber compound 16 molded over the said inner tube 14 and its reinforcement 15.

The spiral sheath 12 is preferably wound of a bright reflective finished spring wire on as flat a pitch as possible and is preferably formed to such a diameter as to normally and lightly contact the long pitch spiral spacer 13 which is of such diameter as to maintain itself in constant contact against the surface of the core 11.

It will be observed that the reflective finish of the sheath 12 will reflect radiant heat waves and that the air space 17 between the said reflective sheath 12 and the core 11 will serve as insulation means to prevent a portion of any heat absorbed by the reflective sheath 12 from being transferred to the said core 11. Inasmuch as a spiral spacer 13 is employed, air in the air space 17 may travel along the core 11 from warm areas to cooler areas. Circulation of air in the said air space 17 is assured because of slight crevices or interstices which form automatically between the convolutions of the spiral sheath 12 when the flexible hose is flexed out of a straight line.

Referring now to the alternate embodiment of the invention disclosed in Figs. 3 and 4, the flexible hose generally designated by the numeral 20 comprises a tubular flexible core 21 covered by a relatively flat pitch spirally wound reflective sheath 22 held in spaced relationship to the said core 21 by deformations or spacers 23 therein. The said core 21 may be of any flexible tubing and is shown in the drawing as composed of an inner tube 24 of rubber or synthetic rubber compound, a fabric reinforcement 25 woven or braided over the said inner tube 24, and an outer cover of rubber or synthetic rubber compound 26 molded over the said inner tube 24 and its reinforcement 25.

The spiral sheath 22 is preferably wound of a bright reflective finished spring wire on as flat a pitch as possible and is provided with inwardly disposed deformations or spacers 23 at circumferentially and longitudinally spaced intervals formed to such an internal diameter as to engage the tubular flexible core 21 and maintain the said spiral sheath 22 in spaced relationship with respect to the said core 21.

It will be observed that the reflective finish of the sheath 22 will reflect radiant heat waves and that the air space 27 between the said reflective sheath 22 and the core 21 will serve as insulation means to prevent a portion of any heat absorbed by the reflective sheath 22 from being transferred to the said core 21. Air in the air space 27 may travel along the core 21 from warm areas to cooler areas. Circulation of air in the said air space 27 is assured because of slight crevices or interstices which form automatically between the convolutions of the spiral sheath 22 when the flexible hose is flexed out of a straight line and because of apertures 28 in the spiral sheath 22 formed by the deformations or spacers 23 in the reflective spiral sheath 22.

In both embodiments of the invention, it is preferable that the air spaces 17 and 27 be maintained at at least twice the diameter of the reflective wire from which the outer sheaths 12 and 22 are formed, this assures proper ventilation in both embodiments and assures the maintenance of apertures 28 in the embodiment of the invention disclosed in Figs. 3 and 4.

Although but two embodiments of the invention have been disclosed and described in detail, it will be understood that various changes including the size, shape, arrangement and detail of the parts thereof may be made without departing from the spirit of the invention, and it is not intended to limit the scope of the invention other than by the terms of the appended claim.

I claim:

A flexible hose comprising a flexible tubular core, a spirally wound reflective wire sheath over said tubular core and spaced substantially uniformly therefrom, the said spiral sheath having deformations formed therein at intervals therearound and therealong for maintaining said sheath in spaced relationship to the said flexible tubular core.

NORMAN M. COUTY.